United States Patent
Kopikare et al.

(10) Patent No.: US 8,576,759 B2
(45) Date of Patent: Nov. 5, 2013

(54) PARTIAL POWER SAVE MODE FOR ACCESS POINTS DURING DEVICE DISCOVERY

(75) Inventors: Milind Kopikare, San Jose, CA (US);
Raja Banerjea, Sunnyvale, CA (US);
Paul A. Lambert, Moutain View, CA (US); Robert Fanfelle, Redwood City, CA (US)

(73) Assignee: Marvell World Trade Ltd., St. Michael (BB)

( * ) Notice: Subject to any disclaimer, the term of this patent is extended or adjusted under 35 U.S.C. 154(b) by 566 days.

(21) Appl. No.: 12/499,390

(22) Filed: Jul. 8, 2009

(65) Prior Publication Data
US 2010/0008277 A1 Jan. 14, 2010

Related U.S. Application Data

(60) Provisional application No. 61/080,138, filed on Jul. 11, 2008.

(51) Int. Cl.
*G08C 17/00* (2006.01)

(52) U.S. Cl.
USPC ........... 370/311; 370/322; 370/337; 370/347; 370/400; 455/574; 455/127.5

(58) Field of Classification Search
USPC .......... 370/311, 321, 322, 337, 347; 455/572, 455/574, 127.1, 127.5
See application file for complete search history.

(56) References Cited

U.S. PATENT DOCUMENTS

| 5,570,369 | A | 10/1996 | Jokinen |
| 5,745,860 | A | 4/1998 | Kallin |
| 5,987,338 | A | 11/1999 | Gibbons et al. |
| 7,298,716 | B2 * | 11/2007 | Abraham et al. ............. 370/321 |
| 2002/0024535 | A1 | 2/2002 | Ueno et al. |
| 2007/0242645 | A1 | 10/2007 | Stephenson et al. |
| 2008/0031199 | A1 * | 2/2008 | Park et al. ...................... 370/336 |
| 2008/0095091 | A1 * | 4/2008 | Surineni et al. ................ 370/311 |
| 2008/0175187 | A1 | 7/2008 | Lowry et al. |
| 2009/0034443 | A1 | 2/2009 | Walker et al. |
| 2009/0054096 | A1 * | 2/2009 | Single ........................... 455/509 |

FOREIGN PATENT DOCUMENTS

| EP | 1318687 | 6/2003 |
| JP | 2001-155788 | 6/2001 |
| JP | 2003-348104 | 12/2003 |

(Continued)

OTHER PUBLICATIONS

Fashandi, S. "Real-Time Handoff in Solar/Battery Powered ESS Mesh Networks." Personal, Indoor and Mobile Radio Communications 3 (Sep. 11, 2005): pp. 1489-494.

Kohvakka et al. "PC/104 Based Wireless Diagnosis Module" IECON-2002. Proceedings of the 28th Annual Conference of the IEEE Industrial Electronics Society. Sevilla, Spain, Nov. 5-8, 2002; vol. 3, Nov. 5, 2002. pp. 2351-2356.

(Continued)

*Primary Examiner* — Alvin Zhu (57) ABSTRACT

An access point includes a beacon module and a control module. The access point transmits a beacon during a beacon interval. The beacon module determines a first portion of the beacon interval and a second portion of the beacon interval. The access point operates in a normal mode during the first portion of the beacon interval. The control module operates the access point in a power save mode during the second portion of the beacon interval. The control module operates the access point in the power save mode in response to a client station not communicating with the access point during the first portion of the beacon interval.

24 Claims, 7 Drawing Sheets

(56) References Cited

FOREIGN PATENT DOCUMENTS

| JP | 2004-336401 | 11/2004 |
|---|---|---|
| JP | 2005-086425 | 3/2005 |
| JP | 2006-528873 | 12/2006 |
| JP | 2007-202134 | 8/2007 |
| JP | 2008-506335 A | 2/2008 |
| JP | 2009-510835 | 3/2009 |
| WO | WO 2004/075583 | 9/2004 |
| WO | WO2005011183 | 2/2005 |
| WO | WO 2006/033443 | 3/2006 |
| WO | WO2007035447 | 3/2007 |
| WO | WO2008021077 | 2/2008 |

OTHER PUBLICATIONS

Sangkyu, Baek. "Performance Analysis of Power Save Mode in IEEE 802.11 Infrastructure WLAN." Telecommunications (Jun. 16, 2008): pp. 1-4.

The International Search Report and the Written Opinion of the International Searching Authority, or the Declaration mailed Nov. 4, 2009 for International Application No. PCT/US2009/050058 filed Sep. 7, 2009; 15 pages.

The International Search Report and the Written Opinion of the International Searching Authority, or the Declaration mailed Oct. 28, 2009 for International Application No. PCT/US2009/050068 filed Jul. 9, 2009; 16 pages.

"Privacy-Preserving 802.11 Access Point Discovery"; Janne Lindqvist et al.; Mar. 16-18, 2009; Zurich, Switzerland; 8 pages.

"Wi-Fi Protected Setup Specification", Version 1.0h; Wi-Fi Alliance™; Dec. 2006; 110 pages.

Wi-Fi Certified™ for Wi-Fi Protected Setup™: Easing the User Experience for Home and Small Office Wi-Fi® Networks; © 2007, 2008, 2009, Wi-Fi Alliance; 14 pages.

Summary of Notice of Reason for Rejection for related Japanese Application No. 2011-517609; Ryuka Law Firm; Oct. 30, 2012; 2 pages.

Sumary of Notice of Reasons for Rejection for related Japanese Application No. 2011-517604; Ryuka Law Firm; Nov. 6, 2012; 2 pages.

Summary of Decision of Rejection for related Japanese Application No. 2011-517609; Ryuka Law Firm; Jan. 29, 2013; 1 page.

Summary of Decision of Rejection for related Japanese Application No. 2011-517604; Ryuka Law Firm; Jun. 11, 2013; 3 pages.

\* cited by examiner

PARTIAL POWER SAVE MODE FOR ACCESS POINTS DURING DEVICE DISCOVERY

CROSS-REFERENCE TO RELATED APPLICATIONS

This disclosure claims the benefit of U.S. Provisional Application No. 61/080,138, filed on Jul. 11, 2008, which is incorporated herein by reference in its entirety.

This disclosure is related to U.S. Provisional Application No. 61/080,133, filed on Jul. 11, 2008, which is incorporated herein by reference in its entirety.

FIELD

The present disclosure relates to a power save mode for access points that can provide partial power saving during device discovery.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
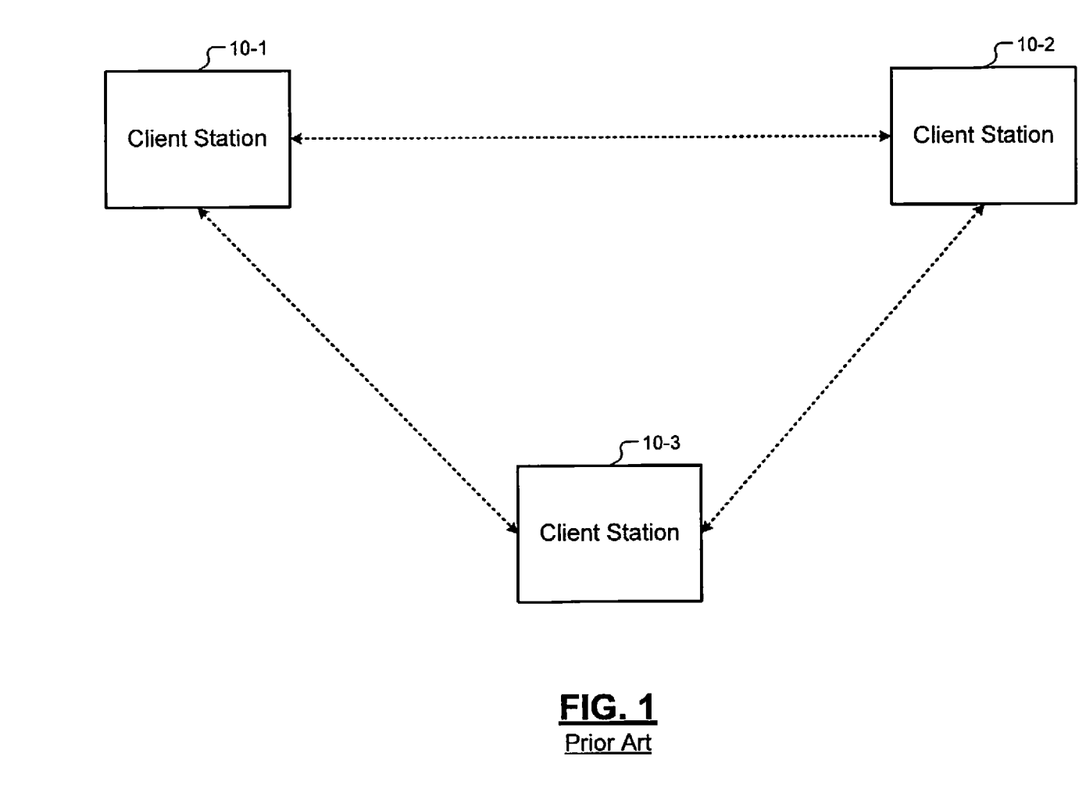
FIG. 1 is a functional block diagram of an exemplary network in ad-hoc mode according to the prior art.
Figure 2:
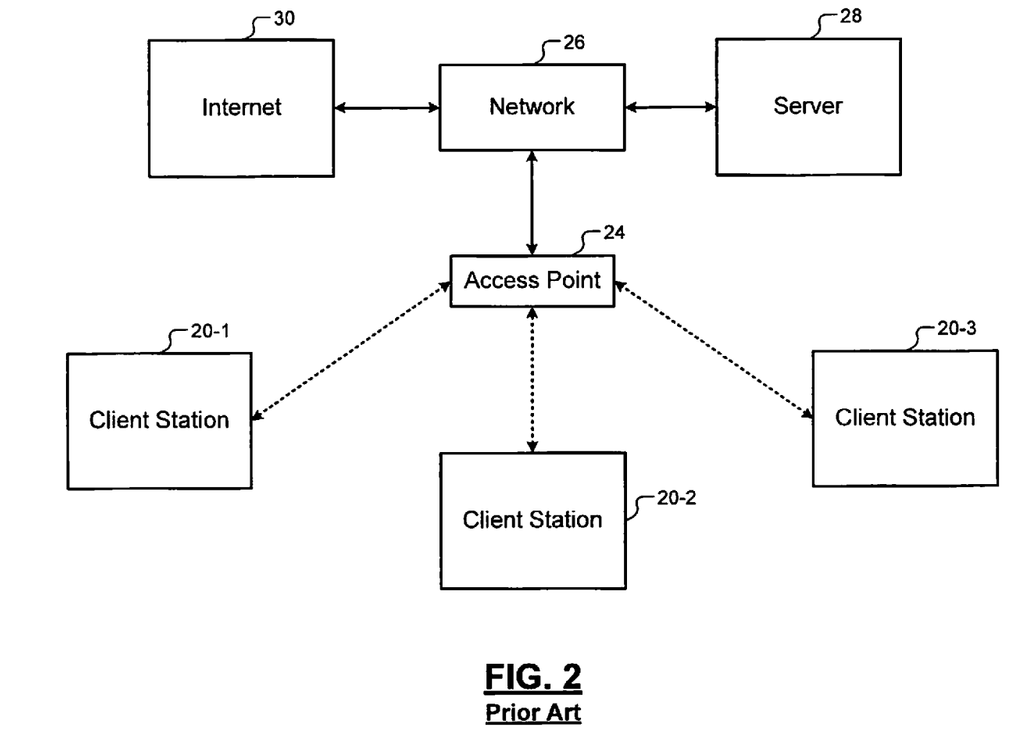
FIG. 2 is a functional block diagram of an exemplary network in infrastructure mode according to the prior art.

Referring now to FIGS. 1 and 2, local area networks (LANS) typically operate in an ad-hoc mode or an infrastructure mode. In FIG. 1, an exemplary LAN operating in the ad-hoc mode is shown. In the ad-hoc mode, each one of the client stations 10-1, 10-2, and 10-3 (collectively client stations 10) communicates directly with other client stations 10 without using an access point (AP). In FIG. 2, an exemplary LAN operating in the infrastructure mode is shown. In the infrastructure mode, each one of the client stations 20-1, 20-2, and 20-3 (collectively client stations 20) communicates with other client stations 20 through an AP 24. Additionally, the AP 24 may connect the client stations 20 to a network 26, a server 28, and to the Internet 30.

Figure 3:
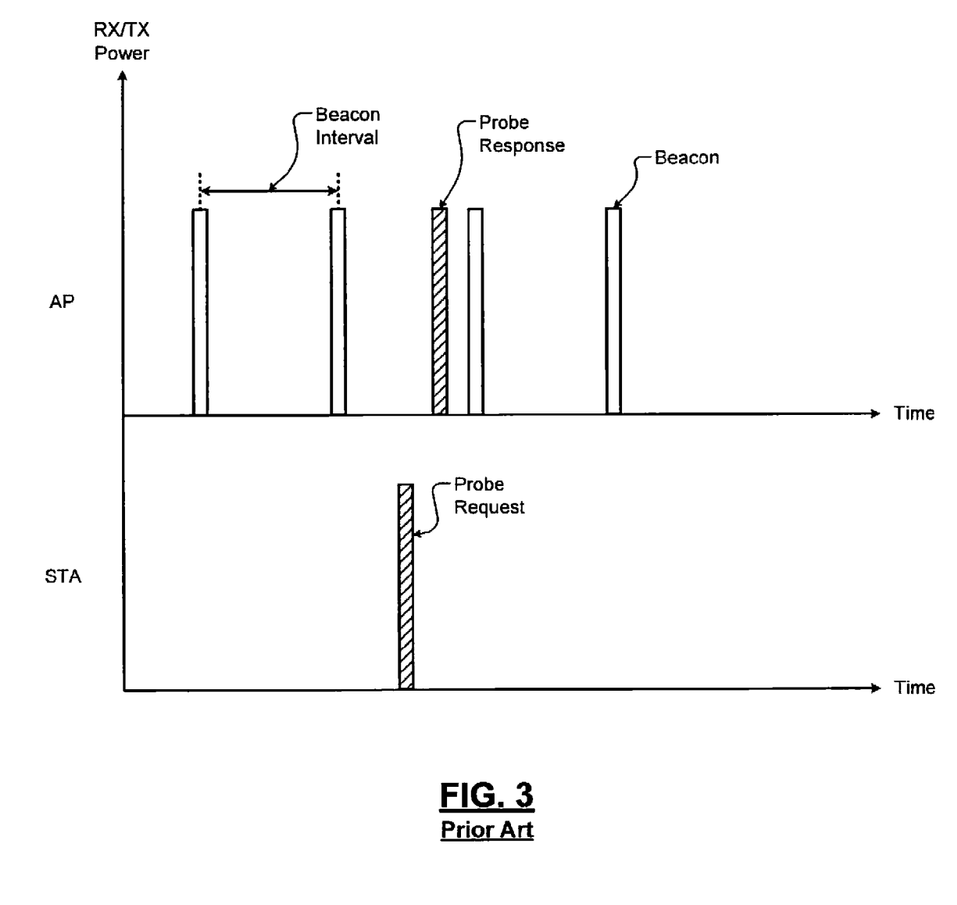
FIG. 3 shows exemplary signals communicated by an access point (AP) and a client station according to the prior art.

Referring now to FIG. 3, the AP 24 transmits beacons to the client stations 20 at a predetermined time interval called a beacon interval. Additionally, the AP 24 transmits a probe response to a client station 20 when the AP 24 receives a probe request from the client station 20.

Based on the beacon interval, each client station 20 can determine a corresponding duration of time to sleep or operate in a power save mode before waking up to communicate with the AP 24. Thus, the client stations 20 can save power by periodically sleeping or operating in the power save mode. The AP 24 stays powered on to transmit beacons at the beacon interval and to transmit probe responses when probe requests are received from the client stations 20.

SUMMARY

An access point comprises a beacon module and a control module. The access point transmits a beacon during a beacon interval. The beacon module determines a first portion of the beacon interval and a second portion of the beacon interval. The access point operates in a normal mode during the first portion of the beacon interval. The control module operates the access point in a power save mode during the second portion of the beacon interval. The control module operates the access point in the power save mode in response to a client station not communicating with the access point during the first portion of the beacon interval.

In another feature, the control module transitions the access point from the power save mode to the normal mode at the end of the second portion of the beacon interval.

In another feature, the first portion of the beacon interval begins at a beginning of the beacon interval. The second portion of the beacon interval begins at an end of the first portion of the beacon interval. The second portion of the beacon interval ends at an end of the beacon interval.

In another feature, the second portion of the beacon interval comprises one half of the beacon interval.

In another feature, the second portion of the beacon interval is less than or equal to a scan time of the client station. The scan time includes an amount of time that the client station scans a first channel to search for the access point prior to scanning a second channel in response to the access point not being detected on the first channel.

In another feature, the control module does not transition the access point from the normal mode to the power save mode in response to the client station communicating with the access point during the first portion of the beacon interval.

In another feature, the control module does not transition the access point from the normal mode to the power save mode in response to receiving a packet from the client station during the first portion of the beacon interval, where the packet indicates that the client station has data to send to the access point.

In another feature, the access point further comprises a power supply to supply power to the access point. The control module controls the power supplied by the power supply to the access point during the normal mode and the power save mode. The power supply supplies normal power to the access point when the access point operates in the normal mode. The power supply supplies no power or less than the normal power to the access point or a portion of the access point when the access point is in the power save mode.

In another feature, the access point further comprises a detection module to determine whether the client station communicates with the access point during the first portion. The detection module determines whether the client station communicates with the access point during the first portion based on whether at least a probe request is received from the client station during the first portion of the beacon interval.

In another feature, the access point transmits a beacon and a probe response when the access point operates in the normal mode. The access point does not transmit the beacon and the probe response when the access point is in the power save mode.

In still other features, the apparatus described above is implemented by a computer program executed by one or more processors. The computer program can reside on a computer-readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Many mobile network devices can operate as access points (APs). Mobile network devices are typically powered by batteries. Minimizing power consumption of the mobile network devices can increase a length of time for which the batteries can supply power to the mobile network devices without recharging the batteries. Specifically, when the mobile network devices operate as APs, the power consumption of the mobile network devices can be reduced by providing a power save mode for the APs.

More specifically, when any client station is not associated with an AP, the AP may be operated in a normal mode during a first portion of a beacon interval and in a power save mode during a second portion of the beacon interval. In the normal mode, the AP performs normal operations including receiving probe requests and transmitting probe responses. In the power save mode, the AP goes to sleep and does not perform the normal operations, thereby saving power.

The first portion of the beacon interval during which the AP is awake and operates in the normal mode may be called an awake time. The second portion of the beacon interval during which the AP sleeps and is in the power save mode may be called a sleep time. A sum of the awake and sleep times is equal to the beacon interval. The awake time begins at a beginning of the beacon interval, and the sleep time ends at an end of the beacon interval.

A ratio of the awake time to the beacon interval may be expressed as a percentage called a duty cycle of the awake time of the AP. Alternatively, a ratio of the sleep time to the beacon interval may be expressed as a percentage called a duty cycle of the sleep time of the AP. For example, the duty cycle may be approximately 50%. When the duty cycle is approximately 50%, the awake and sleep times are approximately equal to one half of the beacon interval. Thus, when the duty cycle is approximately 50%, the AP may operate in the normal mode during a first half of the beacon interval and in the power save mode during a second half of the beacon interval.

The AP transitions to the power save mode and goes to sleep at the end of the awake time when the AP does not receive communication (e.g., a probe request) from any client station during the awake time. In one implementation, the AP may continue to operate in the normal mode at the end of an awake time (rather than going to sleep) in response to the AP receiving a probe request from a client station during the awake time.

Figure 4:
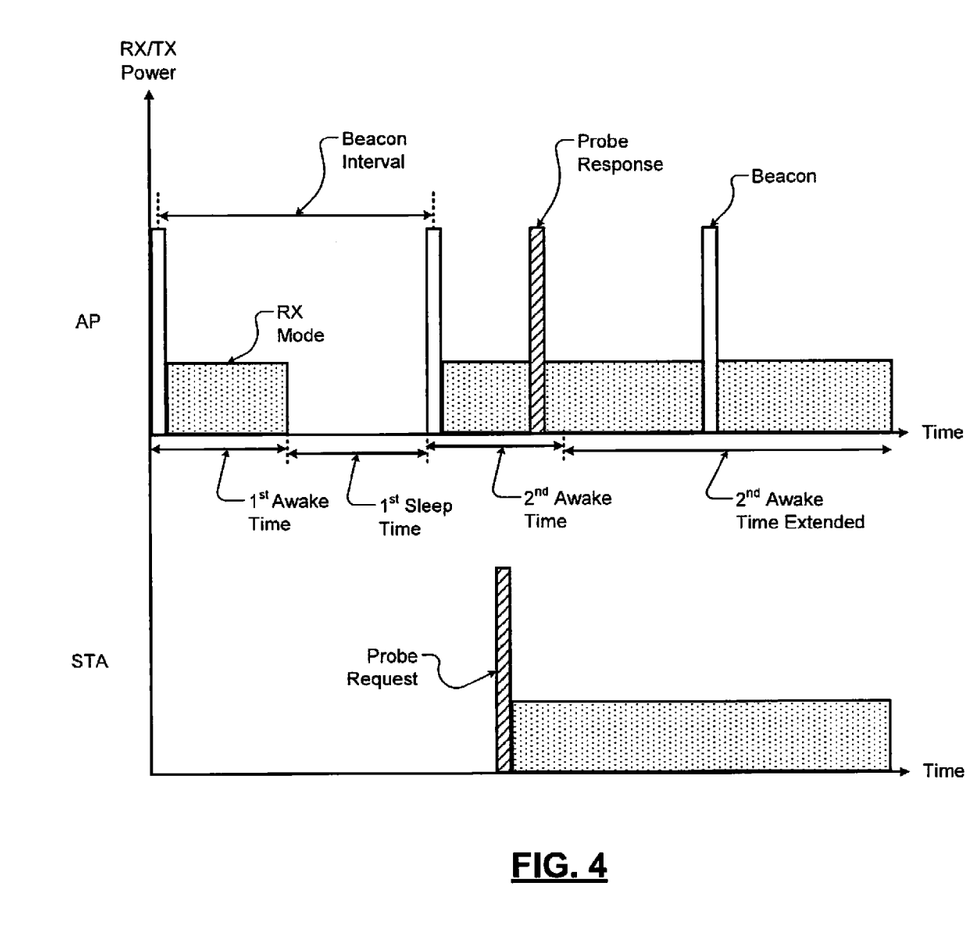
FIG. 4 shows exemplary signals communicated by an access point (AP) and a client station.

Referring now to FIG. 4, the AP may initially operate in the normal mode. Accordingly, the AP transmits a beacon at the beginning of the beacon interval. The AP stays awake during a first awake time. When the AP does not receive any communication from a client station (STA) during the first awake time, the AP transitions to the power save mode at the end of the first awake time. In one implementation, the AP goes to sleep at the beginning of a first sleep time. The AP sleeps until the end of the first sleep time. Although not shown, the cycle of the first awake and sleep times may repeat when the AP does not receive communication from the STA or from any other client stations during awake times.

As shown, however, during a second awake time following the first sleep time, the AP is awake and receives a probe request from the STA. Since the AP is awake, the AP transmits a probe response to the STA. At the end of the second awake time, the AP extends the second awake time to allow the STA to associate with the AP. That is, the AP stays awake and continues to operate in the normal mode instead of transitioning to the power save mode at the end of the second awake time. The AP transmits beacons to client stations and transmits probe responses to probe requests received from the client stations while the AP stays awake.

When the client stations associated with the AP disassociate from the AP, the AP continues to operate in the normal mode until the end of the current beacon interval. In a subsequent beacon interval, the AP transmits a beacon at the beginning of the awake time. The AP goes to sleep (i.e., enters the power save mode) at the end of the awake time when the AP does not receive communication from any client station during the awake time.

In the power save mode, the AP may be partially shut down. When the AP is partially shut down, power supply to one or more components of the AP may be turned off. In some implementations, when the AP is partially shut down, less than normal power may be supplied to one or more components of the AP.

The durations of the awake and/or sleep times may determine whether to supply no power or less than normal power to one or more components of the AP when the AP is partially shut down during the power save mode. For example, when the sleep times are approximately 30-50 milliseconds (mS), less than normal power instead of no power may be supplied to one or more components of the AP when the AP is partially shut down. Supplying less than normal power instead of no power may enable the AP to quickly transition from the power save mode to the normal mode at the beginning of the awake time that follows the sleep time.

The durations of the awake and/or sleep times may depend on a scan time of the client station. The scan time is a maximum amount of time for which the client station may scan a channel to search for an AP on the channel. Typically, a client station scans a first channel for an AP by sending N probe requests, where N is an integer greater than or equal to 1. The client station waits for a probe response from the AP before resending a probe request. The client station may receive a probe response from the AP if the AP is awake. The client station may not receive a probe response from the AP if the AP is sleeping.

When the client station does not receive a probe response, the client station may resend the probe request. When a probe response is not received after sending N probe requests on the first channel, the client station may switch to a second channel and scan the second channel for an AP. In one implementation, N is an integer greater than "0". Thus, the scan time is a difference between a first time when the client station sends a first probe request on a channel and a second time when the client station switches the channel when a probe response is not received after sending N probe requests on the channel. The scan time may be shortest when the client station finds the AP after sending the first probe request. In other words, the scan time is shortest when the AP is awake to receive the first probe request.

The client station is less likely to find an AP on a channel when the sleep time of the AP is greater than the scan time of the client station. The client station may find an AP on a channel when the sleep time of the AP is less than or equal to the scan time of the client station. Accordingly, when the duty cycle of the AP is approximately 50%, the sleep and awake times of the AP may be set to less than or equal to the scan time of the client stations that communicate with the AP.

Typically, client stations that send up to three probe requests to search an AP on a channel may have a scan time of approximately 30-50 mS. Accordingly, the sleep time of the AP may be set to less than or equal to 30 mS. When the duty cycle of the AP is approximately 50%, the sleep and awake times of the AP may be set to approximately 30 mS each, and the beacon interval of the AP may be set to approximately 60 mS.

Since the sleep time of the AP is proportional to the scan time of the client stations, the sleep time of the AP may be increased to save power. When the sleep time of the AP is increased, the scan time of client stations that communicate with the AP may also be proportionally increased. In other words, power consumption of the AP can be controlled by programming the beacon interval and the duty cycle of the AP and by programming the scan times of the client stations that communicate with the AP.

Figure 5:
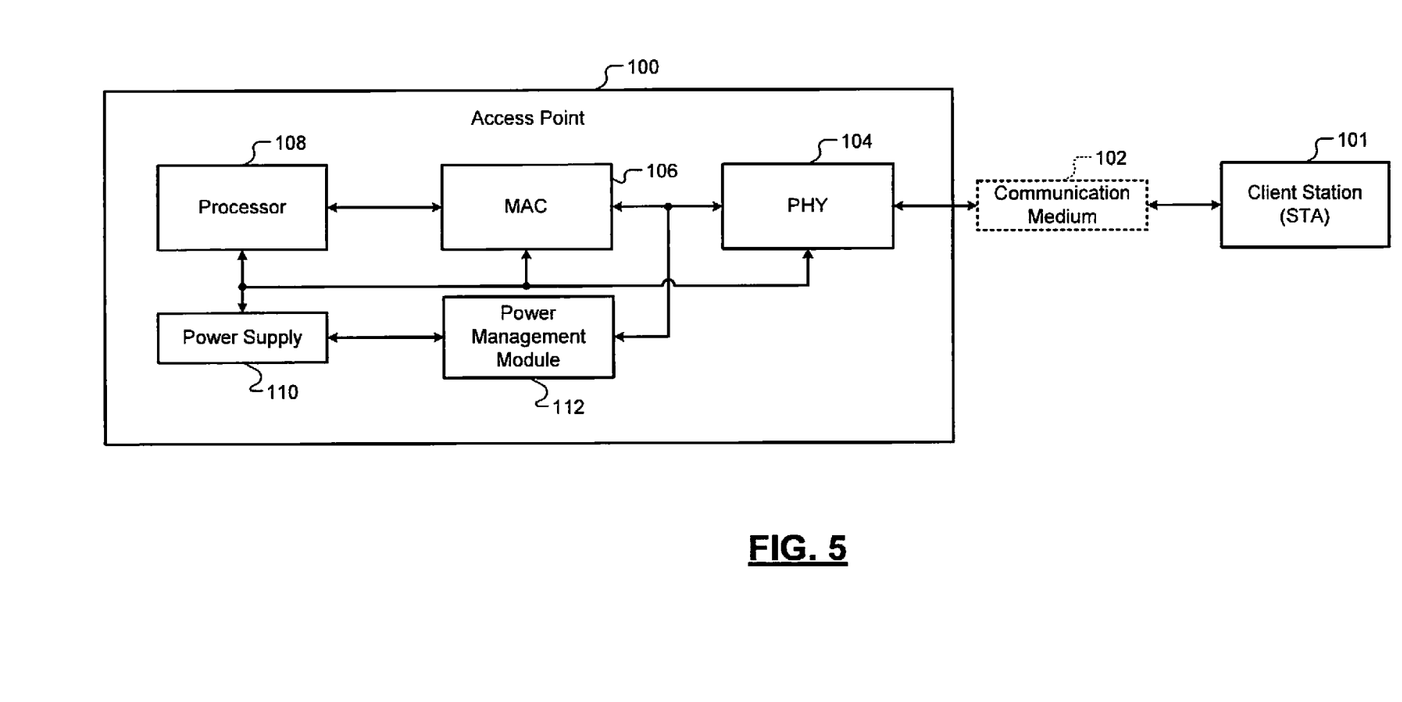
FIG. 5 is a functional block diagram of an exemplary AP having a power save mode according to the present disclosure.

Referring now to FIG. 5, an AP 100 having a power save mode according to the present disclosure is shown. The AP 100 may communicate with other network devices including client stations via a communication medium 102. For example, the AP 100 may communicate with a client station (hereinafter STA) 101 via the communication medium 102. The communication medium 102 may include a wireline or a wireless communication medium.

The AP 100 comprises a physical layer (PHY) 104, a medium access controller (MAC) 106, a processor 108, a power supply 110, and a power management module 112. In some implementations, the power management module 112 or portions thereof may be implemented in one or more of the PHY 104, the MAC 106, and the processor 108.

The PHY 104 interfaces the AP 100 to the communication medium 102. The PHY 104 communicates with client stations via the communication medium 102. For example, the PHY 104 transmits beacons at the beacon interval. Additionally, the PHY 104 may receive probe requests from client stations and may transmit probe responses to the client stations. The MAC 106 controls access to the communication medium 102. The processor 108 processes the data transmitted and received by the PHY 104. The power supply 110 supplies power to the AP 100. The power management module 112 communicates with the PHY 104 (and/or the MAC 106), controls the power supply 110, and determines when the AP 100 enters the power save mode.

Figure 6:
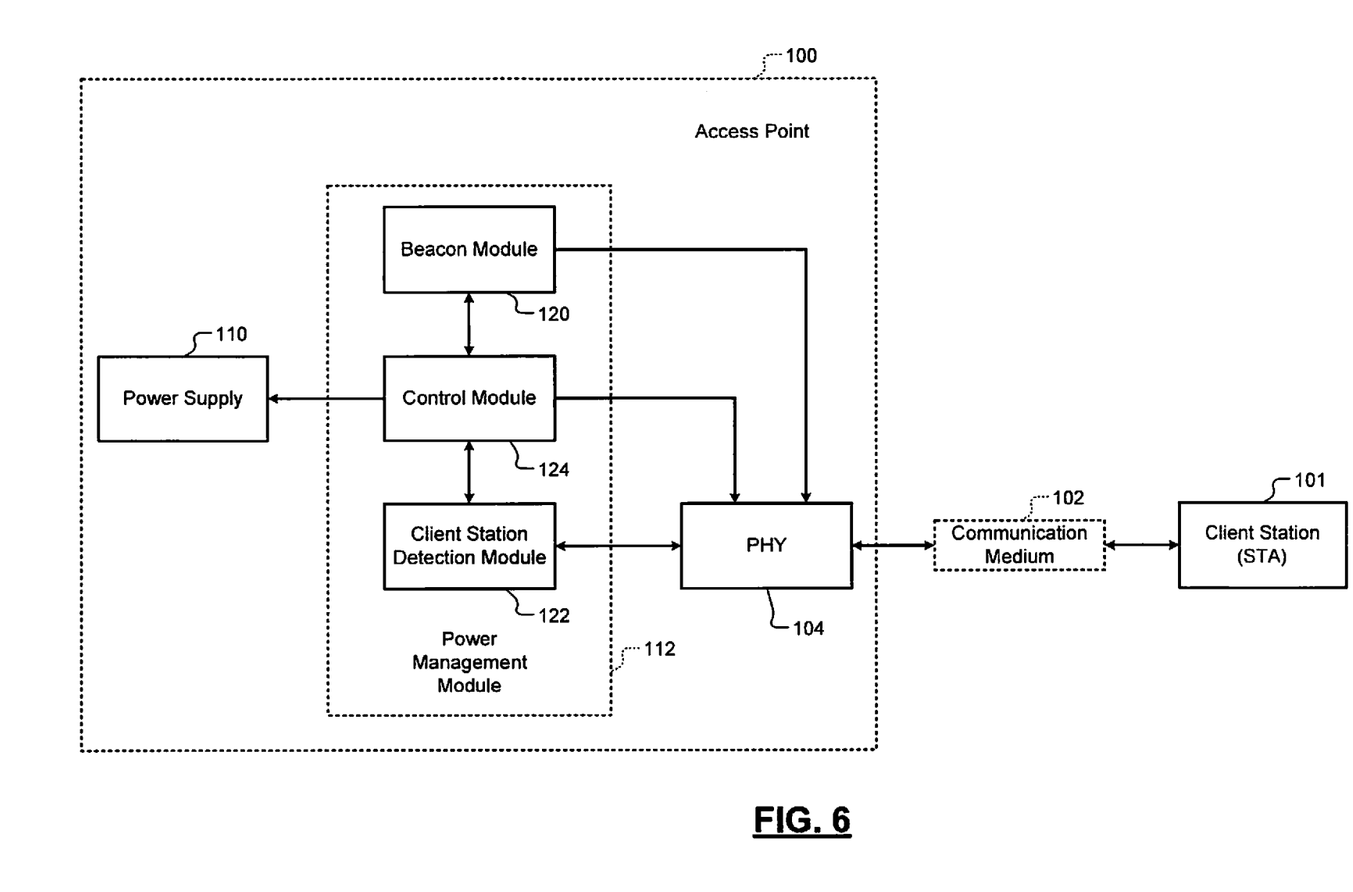
FIG. 6 is a functional block diagram of an exemplary power management module of the AP of FIG. 5.

Referring now to FIG. 6, the power management module 112 comprises a beacon module 120, a client station detection module 122, and a control module 124. The beacon module 120 determines the beacon interval, the awake time, and the sleep time of the AP 100 based on the scan time of the client stations that communicate with the AP 100. The beacon module 120 outputs the beacon interval, the awake time, and the sleep time to the control module 124 and the PHY 104.

The control module 124 determines when to operate the AP 100 in the normal mode and when to operate the AP 100 in the power save mode based on the awake time and the sleep time. The control module 124 controls the power supplied by the power supply 110 to the components of the AP 100 (e.g., the PHY 104, the MAC 106, and the processor 108) in the normal mode and in the power save mode. The control module 124 may activate and deactivate the PHY 104 when the AP 100 operates in the normal mode and in the power save mode, respectively.

When the AP 100 operates in the normal mode, the PHY 104 transmits a beacon at the start of the beacon interval. Additionally, the PHY 104 may transmit probe responses to client stations when probe requests are received from the client stations during the awake time. When the AP 100 is in the power save mode, the PHY 104 does not transmit the beacon and the probe responses.

The client station detection module 122 monitors communication of client stations with the AP 100. The client station detection module 122 detects when a client station does or does not communicate with the AP 100 during the awake time. The client station detection module 122 determines that a client station communicates with the AP 100 during the awake time when at least a probe request is received from the client station during the awake time. The client station detection module 122 determines that any client station does not communicate with the AP 100 during the awake time when at least a probe request is not received from at least one client station during the awake time.

Initially, the AP 100 may begin operating in the normal mode at the start of the awake time. The power supply 110 supplies normal power to the components of the AP 100 at the start of the awake time. The control module 124 may activate the PHY 104. The PHY 104 transmits a beacon at the start of the awake time.

During the awake time, the client station detection module 122 detects whether any client station (e.g., STA 101) communicates with (e.g., sends a probe request to) the AP 100. The client station detection module 122 may not detect communication from any client station during the awake time. At the end of the awake time, the client station detection module 122 outputs a communication detection signal having a first state to the control module 124 when the client station detection module 122 does not detect communication from any client station during the awake time. The first state of the communication detection signal indicates that the client station detection module 122 did not detect communication from any client station during the awake time.

The control module 124 transitions the AP 100 from the normal mode to the power save mode at the end of the awake time when the communication detection signal having the first state is received. For example only, the control module 124 may output a power save signal to the power supply 110 at the end of the awake time when the communication detection signal having the first state is received. The power supply 110 may turn off power to some components of the AP 100 when the power save signal is received. Alternatively, the power supply 110 may supply less than normal power to some components of the AP 100 when the power save signal is received. The control module 124 may deactivate the PHY 104.

At the end of the sleep time, the control module 124 outputs a power up signal to the power supply. When the power up signal is received, the power supply 110 may turn on power to the components of the AP 100 that were turned off during the power save mode. Alternatively, the power supply 110 may supply normal power to the components of the AP 100 when the power up signal is received. The control module 124 may activate the PHY 104.

The AP 100 wakes up (i.e., exits the power save mode), enters the normal mode, and begins normal operation at the start of the awake time. For example, the PHY 104 transmits a beacon at the start of the awake time. Additionally, the PHY 104 may receive probe requests from client stations during the awake time. When the PHY 104 receives probe requests from client stations during the awake time, the PHY 104 may transmit probe responses to the client stations that send the probe requests.

During the awake time, the client station detection module 122 monitors communication of client stations with the AP 100. For example, the client station detection module 122 may detect that a client station communicates with (e.g., transmits a probe request to) the AP 100. Alternatively or additionally, the client station detection module 122 may receive a packet from the client station, where the packet indicates that the client station has data to send to the AP 100. The client station detection module 122 outputs the communication detection signal having a second state to the control module 124 when communication from the client station is detected during the awake time. The second state of the communication detection signal indicates that the client station detection module 122 detected communication from a client station during the awake time.

The control module 124 may not transition the AP 100 from the normal mode to the power save mode at the end of the awake time when the communication detection signal having the second state is received. Instead, the control module 124 may continue to operate the AP 100 in the normal mode. The control module 124 may not deactivate the PHY 104. In other words, the AP 100 may stay awake instead of going to sleep at the end of the awake time when the client station detection module 122 detects communication from a client station during the awake time. Continuing operation in the normal mode may allow the client station that communicated with the AP 100 during the awake time to subsequently associate with the AP 100.

Other client stations may also communicate with the AP 100 while the AP 100 continues to operate in the normal mode. The PHY 104 may continue to transmit beacons at the beginning of each beacon interval. Additionally, the PHY 104 may transmit probe responses when probe requests are received from client stations while the AP 100 continues to operate in the normal mode.

The client station detection module 122 continues to monitor communication of the client stations with the AP 100. The client station detection module 122 detects when the client stations that are associated with the AP 100 disassociate from the AP 100 (i.e., stop communicating with the AP 100). When the client station detection module 122 does not detect communication from any client station for a predetermined period of time, the client station detection module 122 outputs a disassociation detection signal to the control module 124.

After receiving the disassociation detection signal, the control module 124 continues to operate the AP 100 in the normal mode until the end of the current beacon interval and a subsequent awake time. At the end of the current beacon interval and the subsequent awake time, the control module 124 determines whether to transition the AP 100 to the power save mode. The control module 124 transitions the AP 100 to the power save mode at the end of the subsequent awake time when the client station detection module 122 does not detect communication from any client station during the subsequent awake time.

Figure 7:
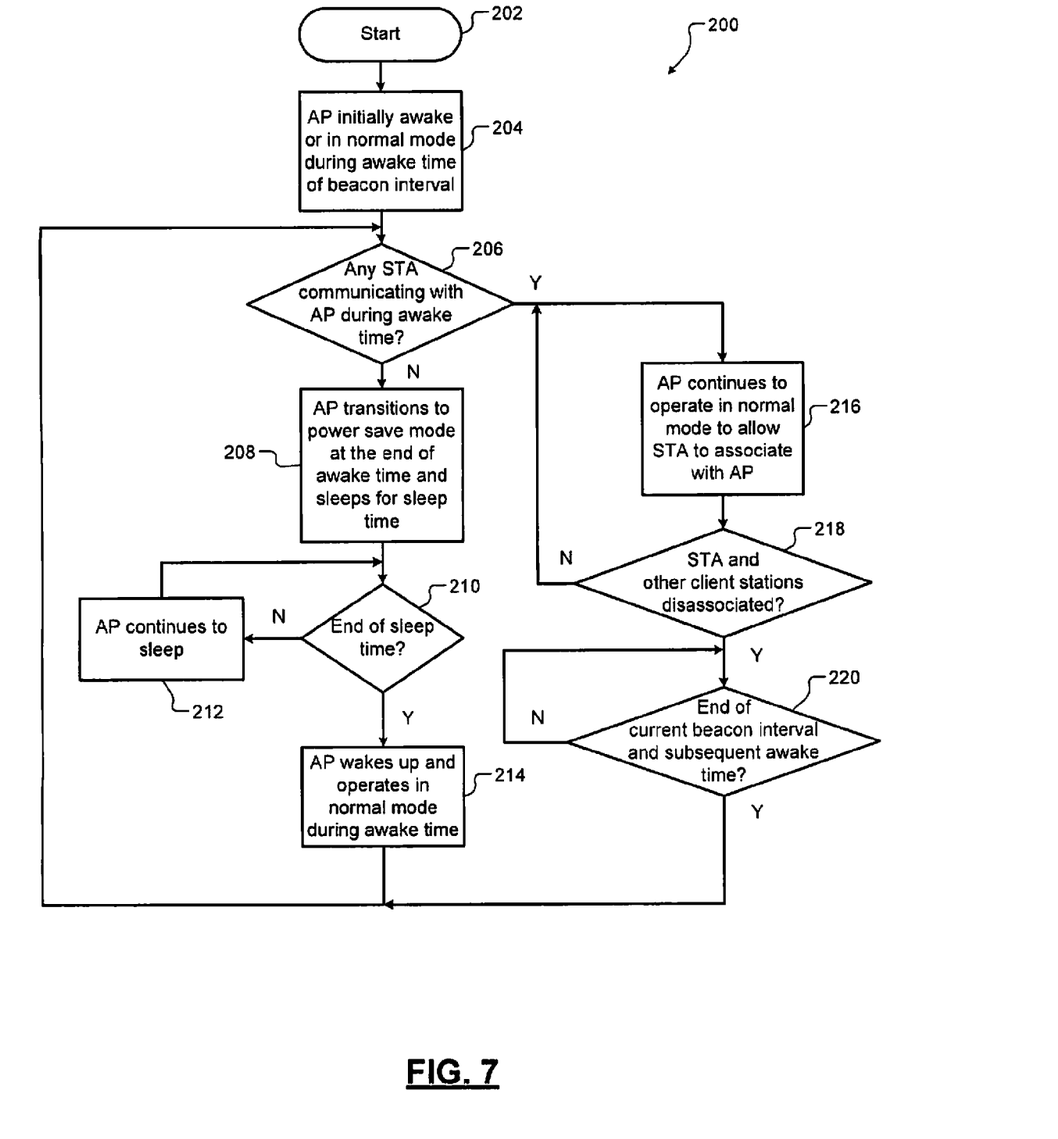
FIG. 7 is a flowchart of an exemplary method for providing the power save mode for the AP of FIG. 5.

Referring now to FIG. 7, a method 200 for providing a power save mode for APs according to the present disclosure is shown. Control begins in step 202. In step 204, the AP is initially awake or operating in the normal mode during the wake time of the beacon interval. Control determines in step 206 whether any client station is communicating with (e.g., sending a probe request to) the AP during the awake time.

When the result of step 206 is false, the AP transitions from the normal to the power save mode at the end of the awake time and goes to sleep for the sleep time in step 208. Control determines in step 210 when the sleep time ends. Control operates the AP in the power save mode (i.e., the AP continues to sleep) in step 212 until the sleep time ends. In step 214, control wakes up the AP at the end of the sleep time and operates the AP in the normal mode during the awake time that follows the sleep time. Subsequently, control returns to step 206.

When, however, the result of step 206 is true, control continues to operate the AP in the normal mode in step 216 to allow the client station that initiates communication with the AP during the wake time to associate with the AP. For example, control extends the awake time of the AP instead of transitioning the AP from the normal mode to the power save mode at the end of the awake time.

Control determines in step 218 when the client station and any other client stations that are associated with the AP disassociate from the AP. Control returns to step 216 until the client station disassociates from the AP. After the client station disassociates from the AP, control determines in step 220 when the current beacon interval and the subsequent awake time end. Control repeats step 220 until the current beacon interval and the subsequent awake time end after the client station disassociate from the AP. Control returns to step 206 when the current beacon interval and the subsequent awake time end after the client station disassociate from the AP.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access point to transmit a beacon during a beacon interval, the access point comprising:
   a beacon module to determine a first portion of the beacon interval and a second portion of the beacon interval, wherein the access point operates in a normal mode during the first portion of the beacon interval; and
   a control module to operate the access point in a power save mode during the second portion of the beacon interval in response to a client station not communicating with the access point during the first portion of the beacon interval,
   wherein the second portion of the beacon interval is less than a scan time of the client station, where the scan time includes an amount of time that the client station scans a first channel to search for the access point prior to scanning a second channel in response to the access point not being detected on the first channel.

2. The access point of claim 1, wherein the control module transitions the access point from the power save mode to the normal mode at an end of the second portion of the beacon interval.

3. The access point of claim 1, wherein:
the first portion of the beacon interval begins at a beginning of the beacon interval;
the second portion of the beacon interval begins at an end of the first portion of the beacon interval; and
the second portion of the beacon interval ends at an end of the beacon interval.

4. The access point of claim 1, wherein the second portion of the beacon interval comprises one half of the beacon interval.

5. The access point of claim 1, wherein the control module does not transition the access point from the normal mode to the power save mode in response to the client station communicating with the access point during the first portion of the beacon interval.

6. The access point of claim 1, wherein the control module does not transition the access point from the normal mode to the power save mode in response to receiving a packet from the client station during the first portion of the beacon interval, where the packet indicates that the client station has data to send to the access point.

7. The access point of claim 1, further comprising a power supply to supply power to the access point, wherein the control module controls the power supplied by the power supply to the access point during the normal mode and the power save mode.

8. The access point of claim 1, further comprising a power supply to supply normal power to the access point when the access point operates in the normal mode, wherein the power supply supplies one of no power and less than the normal power to the access point when the access point is in the power save mode.

9. The access point of claim 1, further comprising a power supply to supply normal power to the access point when the access point operates in the normal mode, wherein the power supply supplies one of no power and less than the normal power to a portion of the access point when the access point is in the power save mode.

10. The access point of claim 1, further comprising a detection module to determine whether the client station communicates with the access point during the first portion.

11. The access point of claim 1, further comprising a detection module to determine whether the client station communicates with the access point during the first portion based on whether at least a probe request is received from the client station during the first portion of the beacon interval.

12. The access point of claim 1, wherein the access point transmits a beacon and a probe response when the access point operates in the normal mode, and wherein the access point does not transmit the beacon and the probe response when the access point is in the power save mode.

13. A method comprising:
determining a first portion and a second portion of a beacon interval of an access point;
operating the access point in a normal mode during the first portion of the beacon interval;
operating the access point in a power save mode during the second portion of the beacon interval in response to a client station not communicating with the access point during the first portion of the beacon interval; and
determining that the second portion of the beacon interval is less than a scan time of the client station,
wherein the scan time includes an amount of time that the client station scans a first channel to search for the access point prior to scanning a second channel in response to the access point not being detected on the first channel.

14. The method of claim 13, further comprising transitioning the access point from the power save mode to the normal mode at an end of the second portion of the beacon interval.

15. The method of claim 13, further comprising:
determining that the first portion of the beacon interval begins at a beginning of the beacon interval;
determining that the second portion of the beacon interval begins at an end of the first portion of the beacon interval; and
determining that the second portion of the beacon interval ends at an end of the beacon interval.

16. The method of claim 13, further comprising determining that the second portion of the beacon interval comprises one half of the beacon interval.

17. The method of claim 13, further comprising not transitioning the access point from the normal mode to the power save mode in response to the client station communicating with the access point during the first portion of the beacon interval.

18. The method of claim 13, further comprising not transitioning the access point from the normal mode to the power save mode in response to receiving a packet from the client station during the first portion of the beacon interval, wherein the packet indicates that the client station has data to send to the access point.

19. The method of claim 13, further comprising controlling power supplied to the access point during the normal mode and the power save mode.

20. The method of claim 13, further comprising:
supplying normal power to the access point when the access point operates in the normal mode; and
supplying one of no power and less than the normal power to the access point when the access point is in the power save mode.

21. The method of claim 13, further comprising:
supplying normal power to the access point when the access point operates in the normal mode; and
supplying one of no power and less than the normal power to a portion of the access point when the access point is in the power save mode.

22. The method of claim 13, further comprising detecting whether the client station communicates with the access point during the first portion.

23. The method of claim 13, further comprising detecting whether the client station communicates with the access point during the first portion based on whether at least a probe request is received from the client station during the first portion of the beacon interval.

24. The method of claim 13, further comprising:
transmitting a beacon and a probe response from the access point when the access point operates in the normal mode; and
not transmitting the beacon and the probe response from the access point when the access point is in the power save mode.

* * * * *